No. 742,871. PATENTED NOV. 3, 1903.
A. HUMMEL.
ARTIFICIAL TREE.
APPLICATION FILED DEC. 31, 1902.
NO MODEL.
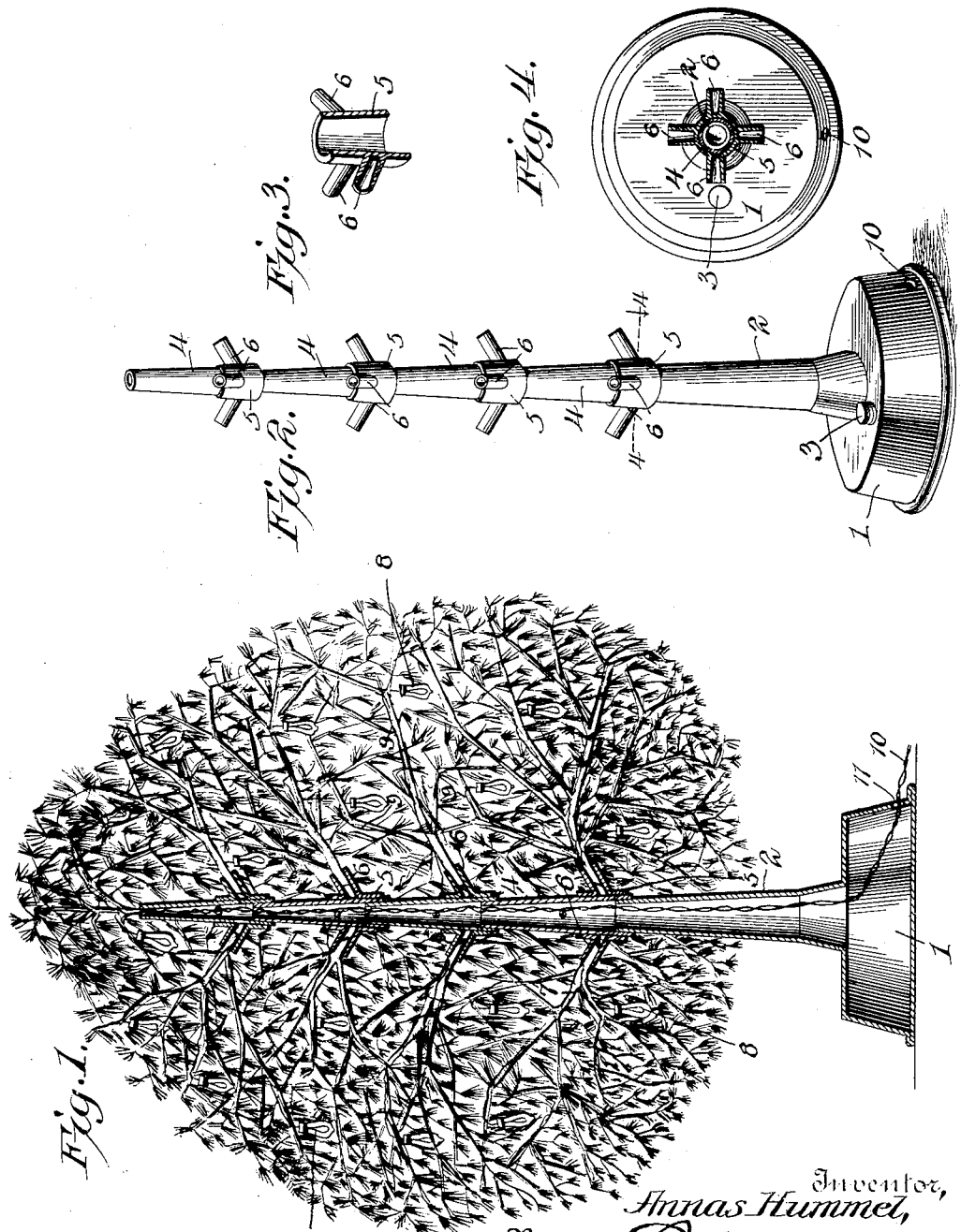
Witnesses
Howard D. Orr.
H. J. Shepard.
Inventor,
Annas Hummel,
By
E. G. Siggers.
Attorney.

No. 742,871. Patented November 3, 1903.

UNITED STATES PATENT OFFICE.

ANNAS HUMMEL, OF HUNTINGDON, PENNSYLVANIA.

ARTIFICIAL TREE.

SPECIFICATION forming part of Letters Patent No. 742,871, dated November 3, 1903.

Application filed December 31, 1902. Serial No. 137,355. (No model.)

*To all whom it may concern:*

Be it known that I, ANNAS HUMMEL, a citizen of the United States, residing at Huntingdon, in the county of Huntingdon and State of Pennsylvania, have invented a new and useful Artificial Tree, of which the following is a specification.

This invention relates to artificial trees, and has for its object to provide an improved stand or holder for the support of natural branches in imitation of a real tree for decorative purposes, it being especially adapted for use as a Christmas tree, and particularly designed to overcome certain disadvantages present in the device described in my prior patent, No. 632,121, dated August 29, 1890.

One of the improvements resides in employing a hollow stem instead of a solid one, as in the original patent, and another consists in making use of a hollow metal base to be filled with gravel or some other material to give it the proper weight.

Another object is to provide for conveniently stringing wires within the device for connection with electric lamps to be carried by the branches of the tree.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a longitudinal sectional view of an artificial tree constructed and arranged in accordance with the present invention. Fig. 2 is a perspective view of the stand or holder with the branches omitted. Fig. 3 is a sectional perspective view of one of the collar or band members having the branch-receiving sockets. Fig. 4 is a cross-sectional view on the line 4 4 of Fig. 2.

Like characters of reference designate corresponding parts in all the figures of the drawings.

The present stand or holder is made up of a hollow pan-like base 1, preferably circular in shape and formed of metal, from the center of the top of which rises a rigid tubular stem 2, which is open at opposite ends and communicates at its lower end with the interior of the base. A screw-cap 3 normally closes a suitable filling-opening in the top of the base, whereby sand, gravel, water, or other material may be introduced into the base to give weight thereto and insure a stable support for the device.

Upon the top of the stem 2 is telescoped an upwardly-tapered tubular stem member 4, which is open at opposite ends, there being a plurality of such members disposed one upon the other, whereby a tree of any height may be obtained, according to the number of stem-sections employed.

A plurality of tapered collars or bands 5 snugly embrace the stem at different elevations and are provided with substantially radial upwardly-inclined sockets 6, which are wedge-shaped and are open at their outer ends to receive the butt-ends of natural branches 7.

Should it be desired to illuminate the tree by electric lights, electric lamps 8 may be hung upon the branches of the tree and connected by branch wires 9, passing through the tubular stem at points between the collars to the main circuit-wires 10, which are located within the tubular stem and pass out through a perforation 11, formed in the side of the base, and are then connected with any suitable source of electricity. (Not shown.) The circuit-wires should, of course, be insulated, so as to obviate short circuits through metallic stem-sections.

Although I have shown a collar or band for each stem-section, it will of course be understood that where longer stem-sections are employed there may be a plurality of collars upon each stem-section; but in any event it is preferred to have a collar at or near the bottom of each section, so as to bring the weight of the branches as near as possible to the lower end of the section, and thereby obviate unsteadiness of one section upon the other. The interlocked ends of the stem-sections constitute a joint, and the branch-receiving sockets, which are located at the lower end of the stem-sections, may be said to be carried by the upper section of the joint, and the weight of the branches will operate to hold the sections interlocked with each other.

From the foregoing description it is apparent that the sectional structure of the present device permits of the same being conveniently stored when not in use, and the telescopic connections between the sections afford every convenience in setting up the device for use and in taking the same apart. Moreover, any number of sections may be assembled to form a single stand or holder, and hence any height of tree may be obtained.

The improvement provides not only an artificial Christmas tree, but when the holidays are over by removing the branches and inserting wooden pegs in the sockets the device can be used as a hat or clothes rack.

What is claimed is—

1. A device of the character described, comprising removable hollow telescopic stem-sections, and branch-receiving sockets located at the joints of the stem-sections and carried by the upper section of the joint.

2. A device of the character described, comprising removable tapering telescopic tubular stem-sections having opposite open ends, and branch-receiving sockets radiating from the stem-sections at the joints thereof and carried by the uppermost section of each joint.

3. A device of the character described, comprising a hollow base, a stem-section rising from the base and communicating with the same, removable hollow telescopic stem-sections carried by and rising from the first-mentioned section, and branch-receiving sockets carried by the respective stem-sections.

4. A device of the character described, comprising a hollow base, a tubular stem rising from the base and communicating therewith, branch-receiving sockets carried by the stem, branches fitted in the sockets, electric lamps carried by the branches, a main electric conductor within the stem, and branch conductors leading from the main conductor outwardly through the stem and connected to the lamps.

5. In a device of the character described, the hollow base provided with a filling-opening for weighting the same with sand, gravel, water or the like.

6. In a device of the character described, the combination with the hollow stem, of the hollow base fitted thereto and closed at the bottom and weighted with sand, gravel, water, or the like.

In testimony that I claim the foregoing as my own I have hereto affixed my signature in the presence of two witnesses.

ANNAS HUMMEL.

Witnesses:
R. A. ORBISON,
M. F. CORBIN.